(12) United States Patent
Chang et al.

(10) Patent No.: US 10,915,150 B2
(45) Date of Patent: Feb. 9, 2021

(54) LINKAGE MECHANISM AND ELECTRONIC DEVICE

(71) Applicants: Chin-Hsien Chang, Taipei (TW); Chih-Hsueh Tsai, Taipei (TW)

(72) Inventors: Chin-Hsien Chang, Taipei (TW); Chih-Hsueh Tsai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/593,974

(22) Filed: Oct. 5, 2019

(65) Prior Publication Data

US 2021/0011521 A1 Jan. 14, 2021

(30) Foreign Application Priority Data

Jul. 11, 2019 (TW) .............................. 108124404 A

(51) Int. Cl.
*G06F 1/16* (2006.01)
*F16H 21/54* (2006.01)

(52) U.S. Cl.
CPC ........... *G06F 1/1681* (2013.01); *F16H 21/54* (2013.01); *G06F 1/1616* (2013.01); *G06F 1/1662* (2013.01)

(58) Field of Classification Search
CPC ..... G06F 1/1662; G06F 1/1666; G06F 1/1671
USPC ........................................ 361/679.08, 679.13
See application file for complete search history.

(56) References Cited

U.S. PATENT DOCUMENTS

| 6,529,370 | B1* | 3/2003 | Kamishima | G06F 1/1616 200/5 A |
|---|---|---|---|---|
| 9,402,323 | B2 | 7/2016 | Osborne et al. | |
| 2016/0102487 | A1* | 4/2016 | Kuramochi | G06F 1/1666 361/679.27 |
| 2016/0259370 | A1* | 9/2016 | Ho | G06F 1/1681 |
| 2019/0377389 | A1* | 12/2019 | Tamura | G06F 1/169 |

FOREIGN PATENT DOCUMENTS

TW M475626 4/2014

* cited by examiner

*Primary Examiner* — Anthony Q Edwards
(74) *Attorney, Agent, or Firm* — JCIPRNET

(57) ABSTRACT

A linkage mechanism includes a pivoting assembly, a cam, a sliding assembly, and a linkage assembly. The cam pivots coaxially with the rotating axis. The sliding assembly is assembled on a plate member and has a leaning surface and a sliding slot. The linkage assembly includes a linkage passing through the sliding slot and a carrier base including at least one bump and fastened to the linkage. When the pivoting assembly drives the cam to pivot from a first position to a second position, the cam pushes against the leaning surface to slide the sliding assembly relative to the plate member in a first direction, and the linkage rotates in the sliding slot to drive the carrier base to move in a second direction, and the bump gradually enters into a cavity of a frame from leaning the frame to move the frame in a third direction.

20 Claims, 11 Drawing Sheets

LINKAGE MECHANISM AND ELECTRONIC DEVICE

CROSS-REFERENCE TO RELATED APPLICATION

This application claims the priority benefit of Taiwan application serial no. 108124404, filed on Jul. 11, 2019. The entirety of the above-mentioned patent application is hereby incorporated by reference herein and made a part of this specification.

BACKGROUND OF THE INVENTION

1. Field of the Invention

The present invention relates to a linkage mechanism and an electronic device, and in particular, to a linkage mechanism having a cam and an electronic device using this linkage mechanism.

2. Description of Related Art

Generally, most notebook computers include an upper body having a display screen and a down body having a host system and/or a keyboard. The upper body is pivotally connected to the down body by using a pivotal structure. However, a conventional keyboard is in a same height status when being used and not being used, and consequently, an overall thickness of a notebook computer cannot be reduced. Therefore, how to enable a keyboard connected to a linkage member to move along with the linkage member through rotation of a pivotal structure, so that the keyboard respectively has different positions when being used and not being used has become one of current problems to be urgently resolved.

SUMMARY OF THE INVENTION

The present invention provides a linkage mechanism, to provide acting forces in a plurality of directions.

The present invention provides an electronic device which adopts the above mentioned linkage mechanism to cause displacement of the frame, so that a height difference is generated between a keyboard and the frame, and the keyboard and the frame have different heights.

The linkage mechanism of the present invention is suitable to be assembled to a plate member covered by a frame. The frame has at least one cavity. The linkage mechanism includes a pivoting assembly, a cam, a sliding assembly, and a linkage assembly. The pivoting assembly includes a rotating axis. The cam is sleeved on a rotating axis to pivot coaxially with the rotating axis. The sliding assembly is assembled on a plate member and has a leaning surface and a sliding slot. The linkage assembly is positioned on the plate member and includes a linkage and a carrier base. The linkage passes through the sliding slot of the sliding assembly, and the carrier base including at least one bump is fastened to the linkage. When the pivoting assembly drives the cam to pivot from a first position to a second position, the cam pushes against the leaning surface to slide the sliding assembly relative to the plate member in a first direction, and the linkage rotates in the sliding slot to drive the carrier base to move in a second direction opposite to the first direction, and the bump gradually enters into a cavity of a frame from leaning the frame to move the frame in a third direction perpendicular to the first direction.

In an embodiment of the present invention, when the pivoting assembly drives the cam to pivot from the first position to the second position, the linkage rotates in the sliding slot in a clockwise direction.

In an embodiment of the present invention, the linkage mechanism further includes: an elastic member, having a first end and a second end opposite to each other. The first end is fixed to the plate member, and the second end is fixed to the carrier base of the linkage assembly.

In an embodiment of the present invention, when the pivoting assembly drives the cam to pivot from the second position to a third position, the cam leans the leaning surface, so that the sliding assembly does not slide, the linkage does not rotate in the sliding slot, the bump is located in the cavity to keep the frame stationary, and the elastic member has a maximum tensile deformation amount in the second direction.

In an embodiment of the present invention, when the pivoting assembly drives the cam to pivot from the third position to a fourth position, an elastic restoring force of the elastic member pulls the sliding assembly to slide in the second direction, the cam bears against the leaning surface, and the linkage rotates in the sliding slot to drive the carrier base to move in the first direction, so that the bump gradually moves from inside the cavity to outside the cavity to lean the frame, causing the frame move in a fourth direction opposite to the third direction.

In an embodiment of the present invention, when the pivoting assembly drives the cam to pivot from the third position to the fourth position, the linkage rotates in the sliding slot in an anticlockwise direction.

In an embodiment of the present invention, the sliding assembly further has at least one locking slot. The linkage mechanism further includes: at least one locking member, passing through the locking slot of the sliding assembly, and positioned on the plate member. When the pivoting assembly drives the cam to pivot from the first position to the second position, and when the pivoting assembly drives the cam to pivot from the third position to the fourth position, the locking slot of the sliding assembly moves relative to the locking member.

In an embodiment of the present invention, the carrier base of the linkage assembly has at least one assembling area and at least one first assembling portion. The plate member has at least one second assembling portion. The first assembling portion is assembled to the second assembling portion, so that the carrier base is positioned on the plate member.

In an embodiment of the present invention, one of the first assembling portion and the second assembling portion is a concave portion, and the other of the first assembling portion and the second assembling portion is a convex portion.

In an embodiment of the present invention, the pivoting assembly further includes a hinge structure, assembled together with the rotating axis.

The electronic device of the present invention includes a first body, a second body, and a linkage mechanism. The second body includes a plate member and a keyboard module. The keyboard module includes a frame and a keyboard extending through the frame. The frame has at least one cavity and covers the plate member. The linkage mechanism at least one pivoting assembly, at least one cam, at least one sliding assembly, and a linkage assembly. The pivoting assembly is pivotally connected between the first body and the second body, and including a rotating axis. The cam is sleeved on a rotating axis to pivot coaxially with the rotating axis. The sliding assembly is assembled on a plate member and has a leaning surface and a sliding slot. The linkage assembly is positioned on the plate member and includes a linkage and a carrier base. The linkage passes through the sliding slot of the sliding assembly, and the carrier base including at least one bump is fastened to the linkage. When the pivoting assembly drives the cam to pivot from a first position to a second position, the cam pushes against the leaning surface to slide the sliding assembly relative to the plate member in a first direction, and the linkage rotates in the sliding slot to drive the carrier base to move in a second direction opposite to the first direction, so that the bump gradually enters into the cavity from leaning the frame to move the frame in a third direction perpendicular to the first direction and to cause the keyboard to gradually have a height difference from the frame from being flush with the frame.

In an embodiment of the present invention, when the pivoting assembly drives the cam to pivot from the first position to the second position, the linkage rotates in the sliding slot in a clockwise direction.

In an embodiment of the present invention, the linkage mechanism further includes: at least one elastic member, having a first end and a second end opposite to each other. The first end is fixed to the plate member, and the second end is fixed to the carrier base of the linkage assembly.

In an embodiment of the present invention, when the pivoting assembly drives the cam to pivot from the second position to a third position, the cam leans the leaning surface, so that the sliding assembly does not slide, the linkage does not rotate in the sliding slot, the bump is located in the cavity to keep the frame stationary, the height difference is maintained between the keyboard and the frame, and the elastic member has a maximum tensile deformation amount in the second direction.

In an embodiment of the present invention, when the pivoting assembly drives the cam to pivot from the third position to a fourth position, an elastic restoring force of the elastic member pulls the sliding assembly to slide in the second direction, the cam bears against the leaning surface, and the linkage rotates in the sliding slot to drive the carrier base to move in the first direction, so that the bump gradually moves from inside the cavity to outside the cavity to lean the frame, causing the frame move in a fourth direction opposite to the third direction, so that the keyboard is gradually flush with the frame from having the height difference from the frame.

In an embodiment of the present invention, when the pivoting assembly drives the cam to pivot from the third position to the fourth position, the linkage rotates in the sliding slot in an anticlockwise direction.

In an embodiment of the present invention, the sliding assembly further has at least one locking slot. The linkage mechanism further includes: at least one locking member, passing through the locking slot of the sliding assembly, and positioned on the plate member. When the pivoting assembly drives the cam to pivot from the first position to the second position, and when the pivoting assembly drives the cam to pivot from the third position to the fourth position, the locking slot of the sliding assembly moves relative to the locking member.

In an embodiment of the present invention, the carrier base of the linkage assembly has at least one assembling area and at least one first assembling portion. The plate member has at least one second assembling portion. The first assembling portion is assembled to the second assembling portion, so that the carrier base is positioned on the plate member.

In an embodiment of the present invention, one of the first assembling portion and the second assembling portion is a concave portion, and the other of the first assembling portion and the second assembling portion is a convex portion.

In an embodiment of the present invention, the pivoting assembly further includes a hinge structure, assembled together with the rotating axis.

Based on the foregoing, in a design of the linkage mechanism of the present invention, the cam pushes against the leaning surface to slide the sliding assembly relative to the plate member in the first direction. At this time, the linkage rotates in the sliding slot to drive the carrier base to move in a second direction opposite to the first direction, and the bump gradually enters into a cavity of a frame from leaning the frame to move the frame in a third direction perpendicular to the first direction. In other words, the linkage mechanism of the present invention may provide the acting forces in the plurality of directions. In addition, for the electronic device on which the linkage mechanism of the present invention is used, the keyboard passing through the frame drives, by using the linkage mechanism, the frame to move, so that the keyboard gradually has a height difference from the frame from being flush with the frame. In short, the linkage mechanism of the present invention can displace the frame of the keyboard module disposed on the linkage assembly thereby exposing the keyboard to the user for pressing.

To make the foregoing features and advantages of the present invention clearer and easier to be understood, embodiments are described in detail in the following with reference to the drawings.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
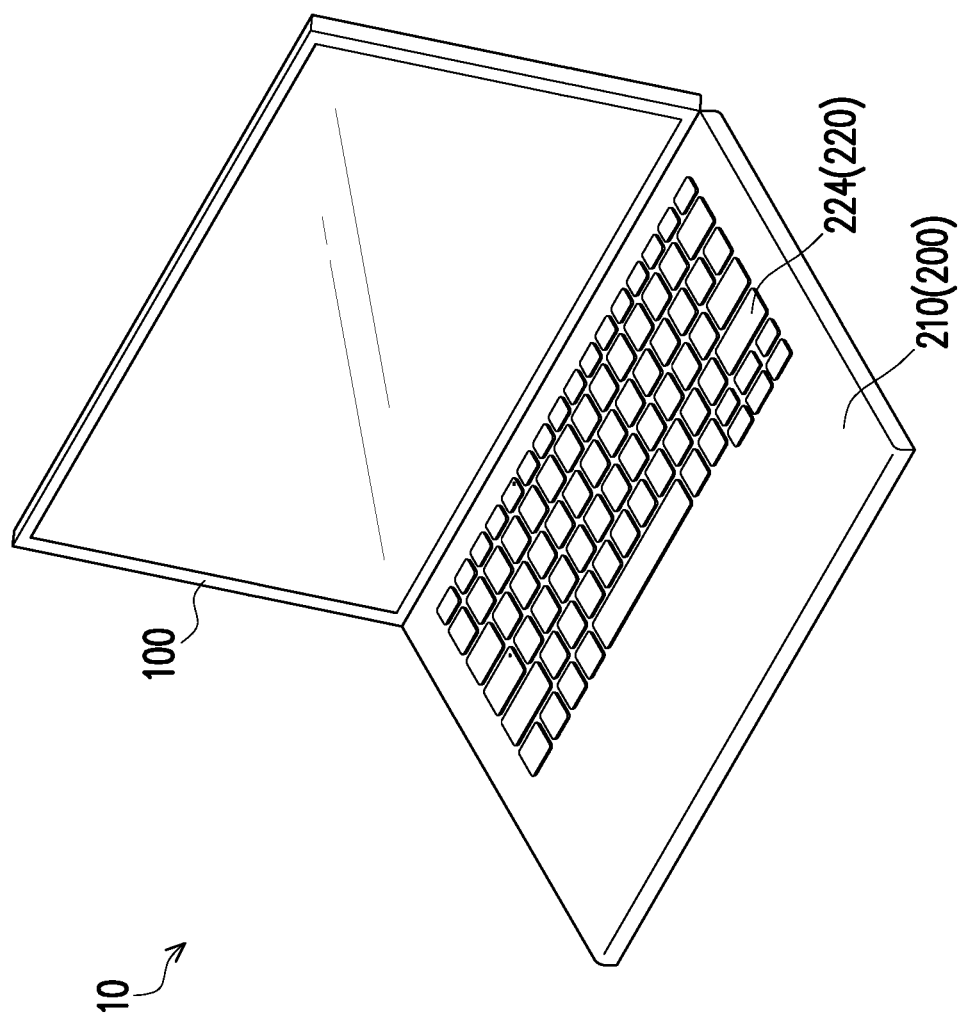
FIG. 1A is a schematic three-dimensional diagram of an electronic device according to an embodiment of the present invention.
Figure 1B:
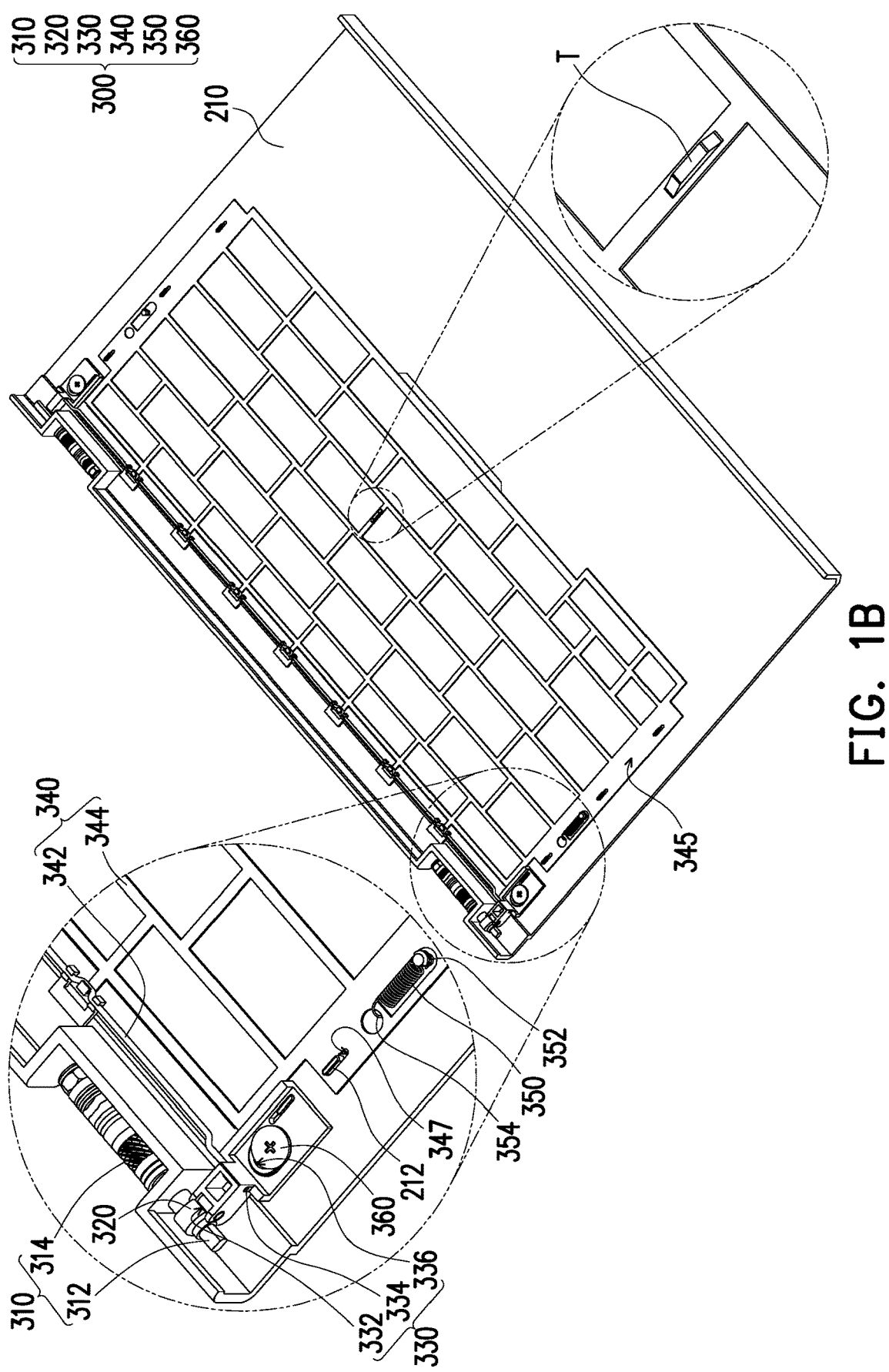
FIG. 1B is a schematic three-dimensional bottom view of a keyboard module and a linkage mechanism of the electronic device in FIG. 1A.
Figure 1C:
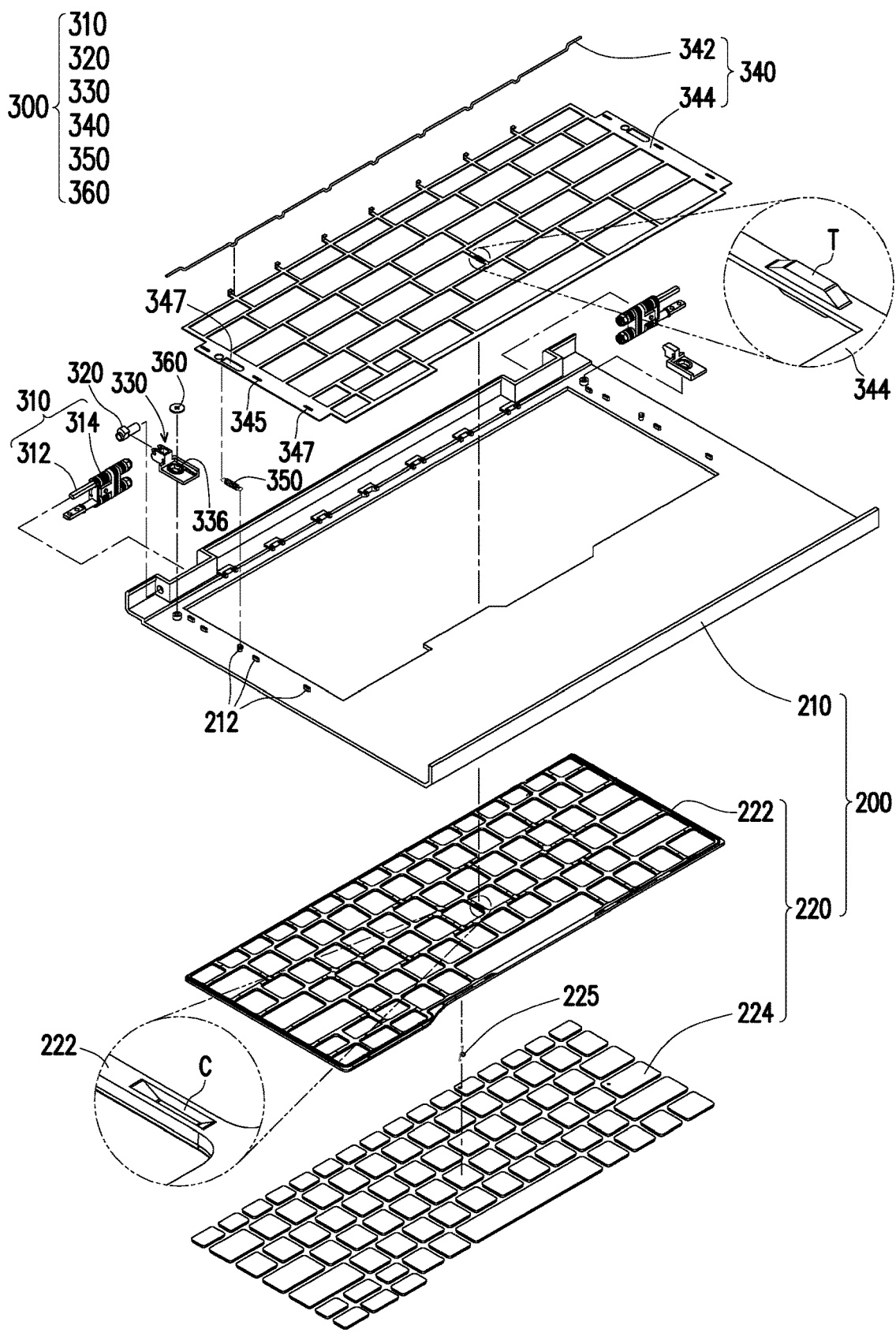
FIG. 1C is a schematic three-dimensional exploded view of the keyboard module and the linkage mechanism of the electronic device in FIG. 1B.

FIG. 1A is a schematic three-dimensional diagram of an electronic device according to an embodiment of the present invention. FIG. 1B is a schematic three-dimensional bottom view of a keyboard module and a linkage mechanism of the electronic device in FIG. 1A. FIG. 1C is a schematic three-dimensional exploded view of the keyboard module and the linkage mechanism of the electronic device in FIG. 1B. FIG. 2A to FIG. 2D are schematic cross-sectional views of operation of a cam and a sliding assembly of the linkage mechanism in FIG. 1B. FIG. 3A to FIG. 3D are schematic cross-sectional views of operation of the keyboard module and the linkage mechanism in FIG. 1B.

Referring to FIG. 1A, FIG. 1B, and FIG. 1C first, in the present embodiment, the electronic device 10 includes a first body 100, a second body 200, and a linkage mechanism 300. The second body 200 includes a plate member 210 and a keyboard module 220. The keyboard module 220 includes a frame 222 and a keyboard 224 passing through the frame 222. For example, the frame 222 and the keyboard 224 may be connected to each other by using a torsion spring 225, but the present invention is not limited thereto. The frame 222 has at least one cavity C, and the frame 222 is suitable to cover the plate member 210. The linkage mechanism 300 includes a pivoting assembly 310, a cam 320, a sliding assembly 330, and a linkage assembly 340. The pivoting assembly 310 is pivotally connected between the first body 100 and the second body 200, and includes a rotating axis 312. The cam 320 is sleeved on a rotating axis 312 to pivot coaxially with the rotating axis 312. The sliding assembly 330 is assembled on the plate member 210 and has a leaning surface 332 and a sliding slot 334. The linkage assembly 340 is positioned on the plate member 210 and includes a linkage 342 and a carrier base 344. The linkage 342 passes through the sliding slot 334 of the sliding assembly 330, and the carrier base 344 including at least one bump T is fastened to the linkage 342.

More specifically, the pivoting assembly 310 in the present embodiment further includes a hinge structure 314, and the hinge structure 314 is assembled together with the rotating axis 312. Herein, the hinge structure 314 of the pivoting assembly 310 is pivotally connected to the first body 100 (such as a display screen) and the second body 200 (such as a system host) of the electronic device 10, so that the first body 100 may be opened or closed relative to the second body 200. The cam 320 has a curved profile, and is sleeved on the rotating axis 312 of the pivoting assembly 310, to pivot coaxially with the rotating axis 312. Herein, a geometrical center to an edge of the cam 320 has a maximum radius and a minimum radius. In other words, the geometrical center to the edge of the cam 320 is not of a certain value.

Moreover, in the present embodiment, the carrier base 344 of the linkage assembly 340 has at least one assembling area 345 and at least one first assembling portion 347, and the plate member 210 has at least one second assembling portion 212. The first assembling portion 347 is assembled to the second assembling portion 212, so that the carrier base 344 is positioned on the plate member 210 of the second body 200. One of the first assembling portion 347 and the second assembling portion 212 is a concave portion, and the other of the first assembling portion 347 and the second assembling portion 212 is a convex portion. Herein, the first assembling portion 347 is specifically the concave portion, and the second assembling portion 212 is specifically the convex portion.

In addition, the linkage mechanism 300 in the present embodiment further includes an elastic member 350, and the elastic member 350 has a first end 352 and a second end 354 opposite to each other. The first end 352 of the elastic member 350 is fixed to the plate member 210, and the second end 354 of the elastic member 350 is fixed to the carrier base 344 of the linkage assembly 340. In addition, the linkage mechanism 300 in the present embodiment further includes at least one locking member 360, and the sliding assembly 330 further has at least one locking slot 336. The locking member 360 passes through the locking slot 336 of the sliding assembly 330, and is positioned on the plate member 210.

Figure 2A:
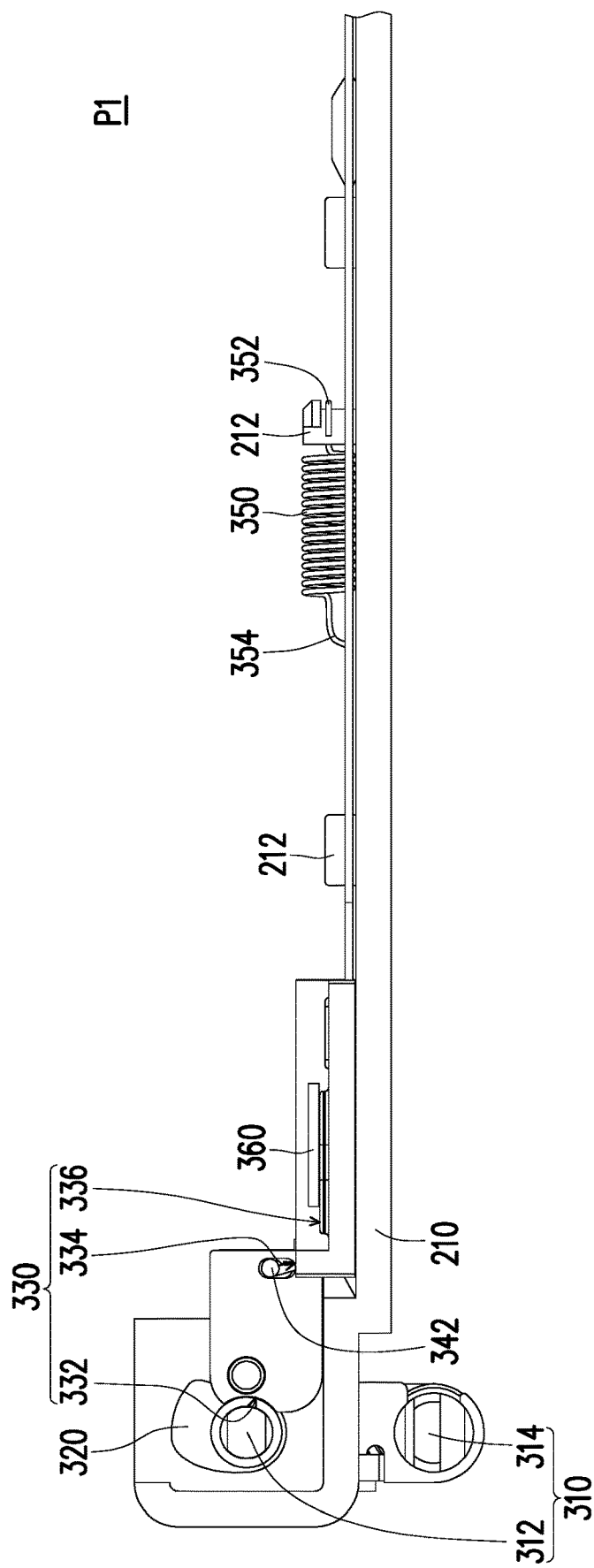
FIG. 2A to FIG. 2D are schematic cross-sectional views of operation of a cam and a sliding assembly of the linkage mechanism in FIG. 1B.
Figure 2B:
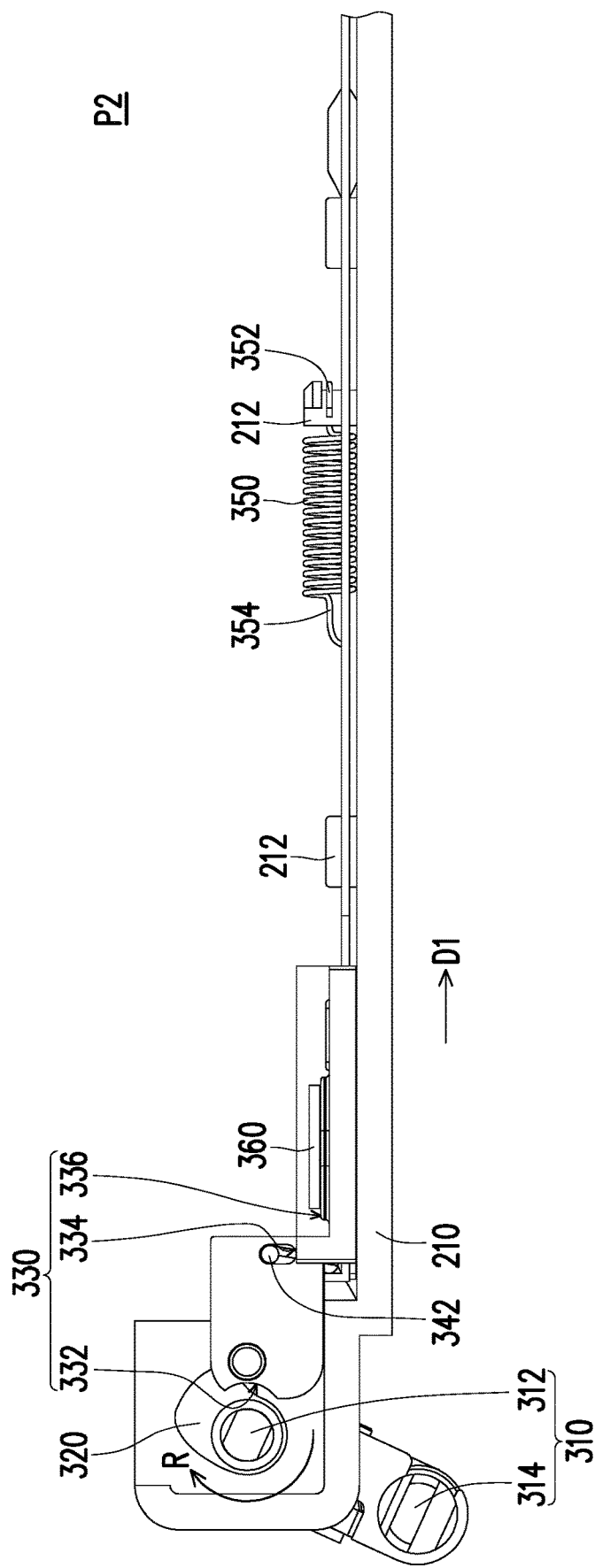
Figure 2C:
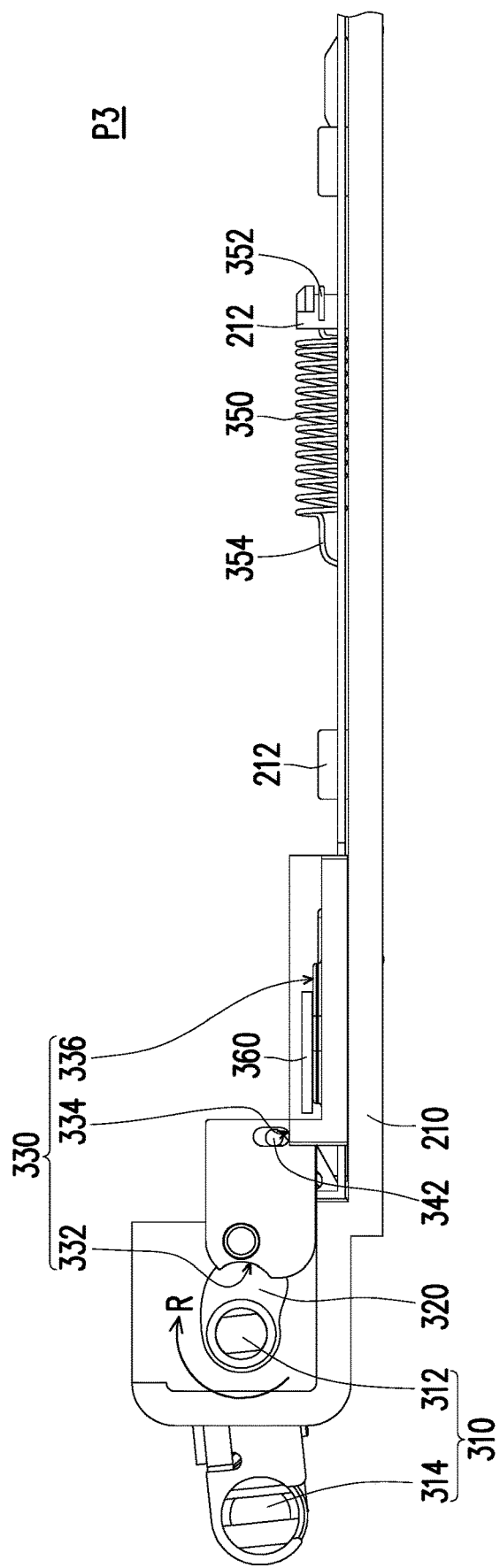
Figure 2D:
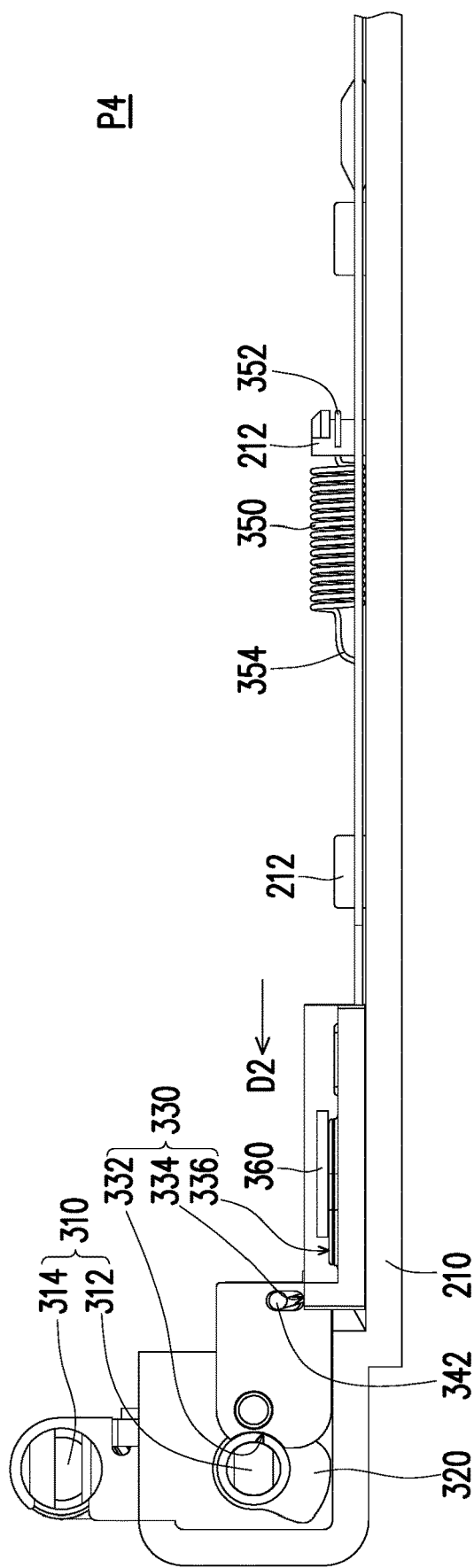
Figure 3A:
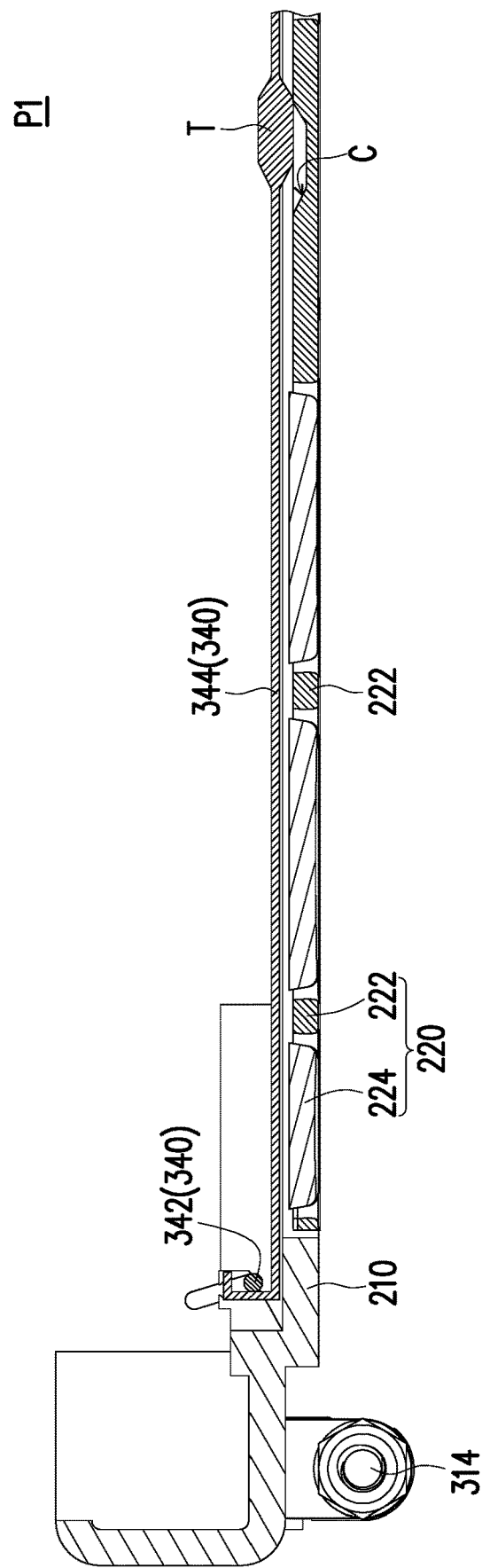
FIG. 3A to FIG. 3D are schematic cross-sectional views of operation of the keyboard module and the linkage mechanism in FIG. 1B.
Figure 3B:
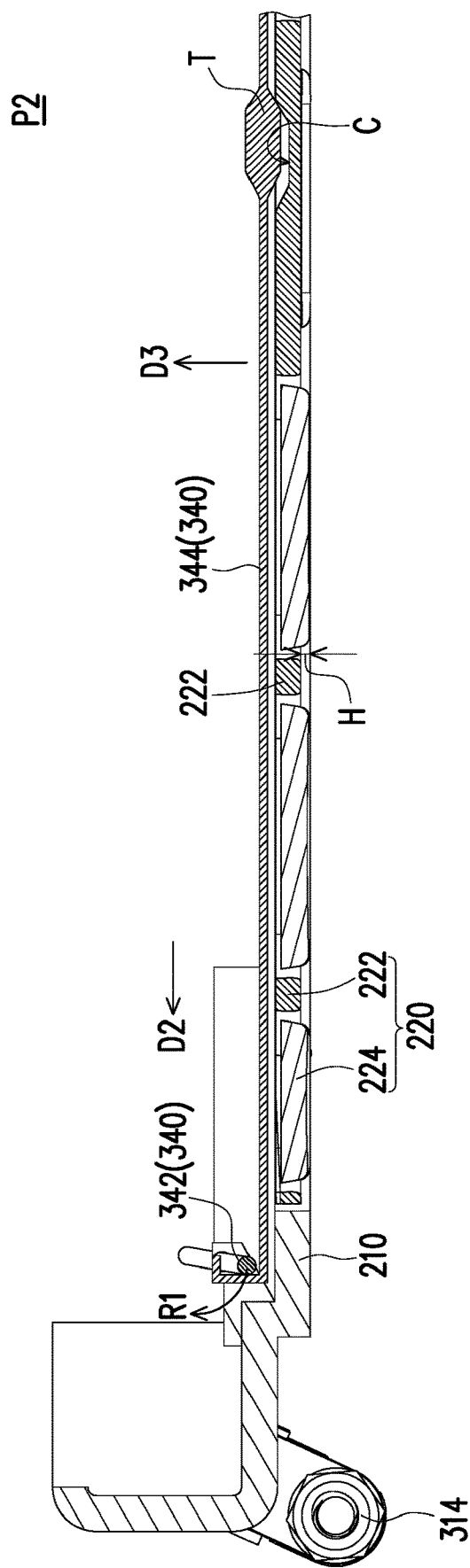
Figure 3C:
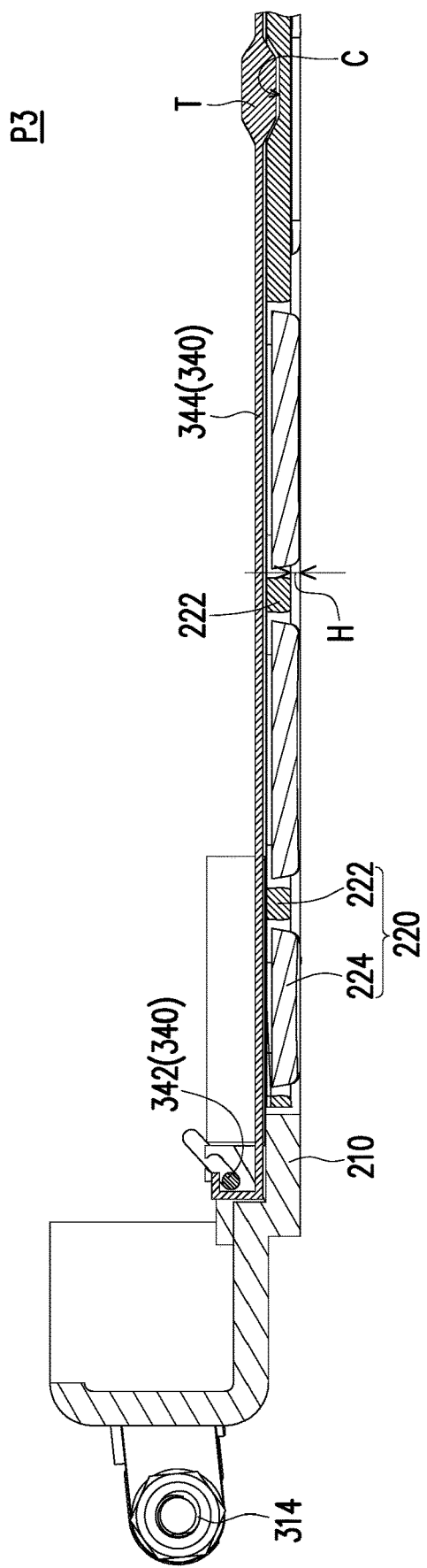
Figure 3D:
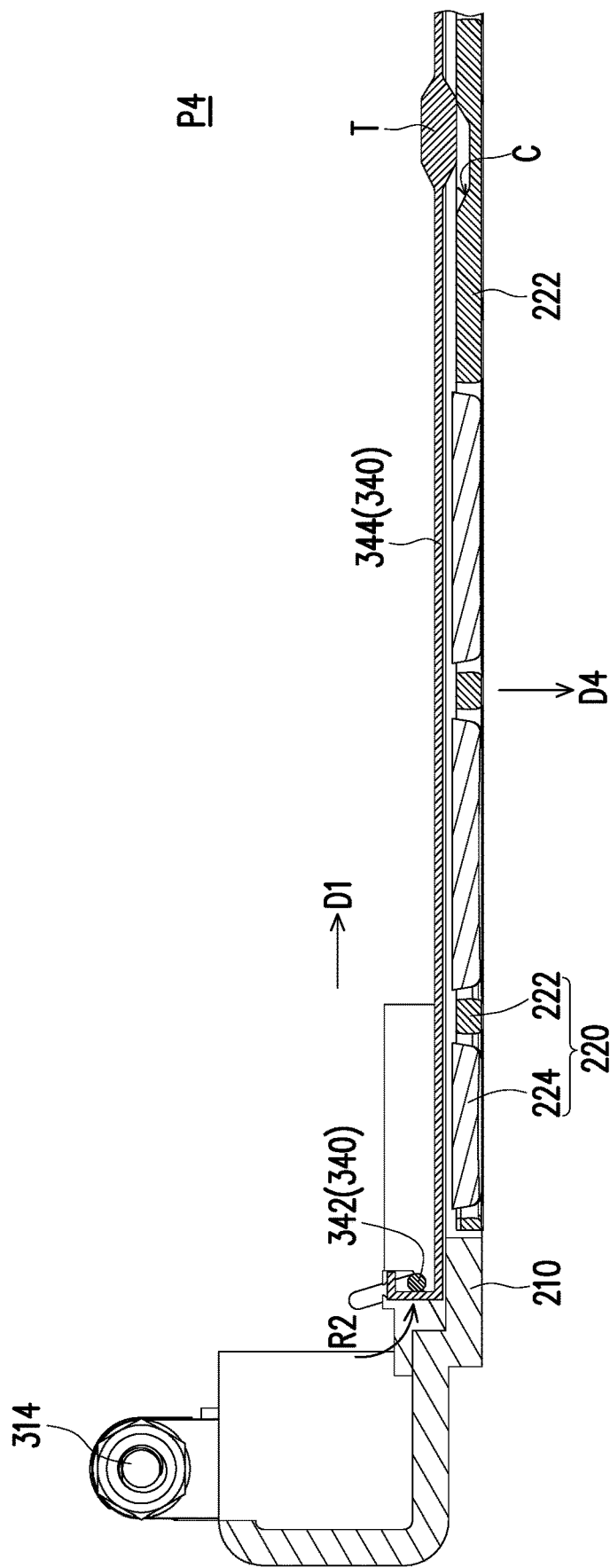

For operation of the linkage mechanism 300, refer to FIG. 1A, FIG. 2A, and FIG. 3A. When the first body 100 of the electronic device 10 is closed relative to the second body 200, that is, has an angle of 0 degrees, the cam 320 is in contact with the leaning surface 332 of the sliding assembly 330 by using the minimum radius. In this case, the cam 320 is located in a first position P1, and the bump T of the carrier base 344 of the linkage assembly 340 leans the frame 222 of the keyboard module 220, so that the frame 222 of the keyboard module 220 is flush with the keyboard 224. Therefore, the keyboard 224 cannot be pressed.

Next, referring to FIG. 2A, FIG. 2B, FIG. 3A, and FIG. 3B, when the pivoting assembly 310 drives the cam 320 to pivot from the first position P1 to a second position P2, the cam 320 pushes against the leaning surface 332 to slide the sliding assembly 330 relative to the plate member 210 in a first direction D1 (such as a Y direction), and the linkage 342 rotates in the sliding slot 334 to drive the carrier base 344 to move in a second direction D2 opposite to the first direction D1, so that the bump T gradually enters into the cavity C from leaning the frame 222, to move the frame 222 in a third direction D3 (such as a Z direction) perpendicular to the first direction D1, so that the keyboard 224 gradually has a height difference H from the frame 222 from being flush with the frame 222.

More specifically, when the pivoting assembly 310 pivots, so that an opening angle of the first body 100 (refer to FIG. 1A) relative to the second body 200 (refer to FIG. 1A) is 0 degrees to 90 degrees, the cam 320 rotates along with the rotating axis 312 in a clockwise direction R from the minimum radius to the maximum radius, to provide a pushing force to slide the sliding assembly 330. In this case, the locking slot 336 of the sliding assembly 330 moves relative to the locking member 360. Moreover, the cam 320 rotates to push the linkage 342 to rotate in the sliding slot 334 in a clockwise direction R1, to pull the carrier base 344 to move to the hinge structure 314. At this time, the bump T of the carrier base 344 gradually enters into the cavity C of the frame 222, so that the keyboard 224 gradually has the height difference H from the frame 222 from being flush with the frame 222. In other words, the keyboard 224 is gradually exposed, for a user to press.

Next, referring to FIG. 2B, FIG. 2C, FIG. 3B, and FIG. 3C, when the pivoting assembly 310 drives the cam 320 to pivot from the second position P2 to a third position P3, the cam 320 leans the leaning surface 332, so that the sliding assembly 330 does not slide, and the linkage 342 does not rotate in the sliding slot 334. At this time, the bump T is located in the cavity C, so that the frame 222 is static, the height difference H is maintained between the keyboard 224 and the frame 222, and the elastic member 350 has a maximum tensile deformation amount in the second direction D2.

When the pivoting assembly 310 pivots to make the opening angle of the first body 100 (refer to FIG. 1A) relative to the second body 200 (refer to FIG. 1A) 90 degrees to 180 degrees, the cam 320 in this phase is in contact with the leaning surface 332 of the sliding assembly 330 by using the maximum radius. In other words, the rotation of the cam 320 along with the rotating axis 312 is continuously maintained at the maximum radius. Therefore, the cam 320 rotates but does not push the sliding assembly 330, in other words, the sliding assembly 330 is static. Because the sliding assembly 330 does not move, the sliding assembly 330 does not interfere with the linkage 342 of the linkage assembly 340, and therefore, the linkage 342 does not rotate in the sliding slot 334 of the sliding assembly 330. The elastic member 350 is extended to the maximum, generating a maximum force in an opposite direction (namely, the second direction D2). At this time, the bump T of the carrier base 344 is static in the cavity C of the frame 222, so that the height difference H is maintained between the keyboard 224 and the frame 222, for the user to press the keyboard 224.

Finally, referring to FIG. 2C, FIG. 2D, FIG. 3C, and FIG. 3D, when the pivoting assembly 310 drives the cam 320 to pivot from the third position P3 to a fourth position P4, an elastic restoring force of the elastic member 350 pulls the sliding assembly 330 to slide in the second direction D2, the cam 320 bears against the leaning surface 334, and the linkage 340 rotates in the sliding slot 334 to drive the carrier base 344 to move in the first direction D1, so that the bump T gradually moves from inside the cavity C to outside the cavity C to lean the frame 222, making the frame 222 move in a fourth direction D4 opposite to the third direction D3, and the keyboard 224 is gradually flush with the frame 222 from having the height difference H from the frame 222.

When the pivoting assembly 310 pivots to make the opening angle of the first body 100 (refer to FIG. 1A) relative to the second body 200 (refer to FIG. 1A) 180 degrees to 360 degrees, the cam 320 rotates along with the rotating axis 312 from the maximum radius to the minimum radius. The cam 320 bears against the leaning surface 332 of the sliding assembly 330, the elastic member 350 provides an elastic restoring force to pull the sliding assembly 330 to move in the second direction D2, and the locking slot 336 of the sliding assembly 330 moves relative to the locking member 360, and push the linkage 342 of the sliding slot 336, causing the linkage 342 to rotate in the sliding slot 334 in an anticlockwise direction R2. At this time, the carrier base 344 fastened to the linkage 342 moves in the first direction D1, so that the bump T of the carrier base 344 gradually moves from inside the cavity C of the frame 222 to outside the cavity C to lean the frame 222, making the frame 222 move in a fourth direction D4, and the keyboard 224 is gradually flush with the frame 222. Therefore, the keyboard 224 cannot be pressed.

In short, when the pivoting assembly 310 pivots to make the opening angle of the first body 100 (refer to FIG. 1A) relative to the second body 200 (refer to FIG. 1A) 90 degrees to 180 degrees, referring to FIG. 2B, FIG. 2C, FIG. 3B, and FIG. 3C, the bump T of the carrier base 344 is in the cavity C of the frame 222, so that the keyboard 224 of the keyboard module 220 protrudes relative to the frame 222, for the user to press. When the pivoting assembly 310 pivots to make the opening angle of the first body 100 relative to the second body 200 greater than 180 degrees or less than 90 degrees, the bump T of the carrier base 344 gradually moves from inside the cavity C of the frame 222 to outside the cavity C to lean the frame 222, making the keyboard 224 gradually flush with the frame 222. When the pivoting assembly 310 pivots to make the opening angle of the first body 100 relative to the second body 200 0 degrees or 360 degrees, referring to FIG. 2A, FIG. 2D, FIG. 3A, and FIG. 3D, the bump T of the carrier base 344 leans the cavity C of the frame 222, making the keyboard 224 flush with the frame 222, and the user cannot press the keyboard 224.

Based on the foregoing, in a design of the linkage mechanism of the present invention, the cam pushes against the leaning surface to slide the sliding assembly relative to the plate member in the first direction. At this time, the linkage rotates in the sliding slot to drive the carrier base to move in a second direction opposite to the first direction, and the bump gradually enters into a cavity of a frame from leaning the frame to move the frame in a third direction perpendicular to the first direction. In other words, the linkage mechanism of the present invention may provide the acting forces in the plurality of directions. In addition, for the electronic device on which the linkage mechanism of the present invention is used, the keyboard passing through the frame drives, by using the linkage mechanism, the frame to move, so that the keyboard gradually has a height difference from the frame from being flush with the frame. In short, the linkage mechanism of the present invention can displace the frame of the keyboard module disposed on the linkage assembly thereby exposing the keyboard to the user for pressing.

Although the present invention is disclosed above in the embodiments, the embodiments are not used for limiting the present invention. Any person of ordinary skill in the art may make some changes and modifications without disobeying the spirit and scope of the present invention. Therefore, the protection scope of the present invention shall be subjected to the scope defined in the claims.

What is claimed is:

1. A linkage mechanism, suitable to be assembled to a plate member covered by a frame, wherein the frame has at least one cavity, and the linkage mechanism comprises:
    a pivoting assembly, comprising a rotating axis;
    a cam, sleeved on the rotating axis, to pivot coaxially with the rotating axis;
    a sliding assembly, assembled to the plate member, and has a leaning surface and a sliding slot; and
    a linkage assembly, positioned on the plate member, and comprising a linkage and a carrier base, wherein the linkage passes through the sliding slot of the sliding assembly, and the carrier base is fastened to the linkage and comprises at least one bump, wherein
    when the pivoting assembly drives the cam to pivot from a first position to a second position, the cam pushes against the leaning surface to slide the sliding assembly relative to the plate member in a first direction, and the linkage rotates in the sliding slot to drive the carrier base to move in a second direction opposite to the first direction, so that the at least one bump gradually enters into the at least one cavity from leaning the frame to move the frame in a third direction perpendicular to the first direction.

2. The linkage mechanism according to claim 1, wherein when the pivoting assembly drives the cam to pivot from the first position to the second position, the linkage rotates in the sliding slot in a clockwise direction.

3. The linkage mechanism according to claim 1, further comprising:
    an elastic member, having a first end and a second end opposite to each other, wherein the first end is fixed to the plate member, and the second end is fixed to the carrier base of the linkage assembly.

4. The linkage mechanism according to claim 3, wherein when the pivoting assembly drives the cam to pivot from the second position to a third position, the cam leans the leaning surface, so that the sliding assembly does not slide, the linkage does not rotate in the sliding slot, the at least one bump is located in the at least one cavity to keep the frame stationary, and the elastic member has a maximum tensile deformation amount in the second direction.

5. The linkage mechanism according to claim 4, wherein when the pivoting assembly drives the cam to pivot from the third position to a fourth position, an elastic restoring force of the elastic member pulls the sliding assembly to slide in the second direction, the cam bears against the leaning surface, and the linkage rotates in the sliding slot to drive the carrier base to move in the first direction, so that the at least one bump gradually moves from inside the at least one cavity to outside the at least one cavity to lean the frame, causing the frame move in a fourth direction opposite to the third direction.

6. The linkage mechanism according to claim 5, wherein when the pivoting assembly drives the cam to pivot from the third position to the fourth position, the linkage rotates in the sliding slot in an anticlockwise direction.

7. The linkage mechanism according to claim 5, wherein the sliding assembly further has at least one locking slot, and the linkage mechanism further comprises:
at least one locking member, passing through the at least one locking slot of the sliding assembly, and positioned on the plate member, wherein when the pivoting assembly drives the cam to pivot from the first position to the second position, and when the pivoting assembly drives the cam to pivot from the third position to the fourth position, the at least one locking slot of the sliding assembly moves relative to the at least one locking member.

8. The linkage mechanism according to claim 1, wherein the carrier base of the linkage assembly has at least one assembling area and at least one first assembling portion, the plate member has at least one second assembling portion, and the at least one first assembling portion is assembled to the at least one second assembling portion, so that the carrier base is positioned on the plate member.

9. The linkage mechanism according to claim 8, wherein one of the at least one first assembling portion and the at least one second assembling portion is a concave portion, and the other of the at least one first assembling portion and the at least one second assembling portion is a convex portion.

10. The linkage mechanism according to claim 1, wherein the pivoting assembly further comprises a hinge structure, assembled together with the rotating axis.

11. An electronic device, comprising:
a first body;
a second body, comprising a plate member and a keyboard module, wherein the keyboard module comprises a frame and a keyboard extending through the frame, and the frame has at least one cavity and covers the plate member; and
a linkage mechanism, comprising:
at least one pivoting assembly, pivotally connected between the first body and the second body, and comprising a rotating axis;
at least one cam, sleeved on the rotating axis, to pivot coaxially with the rotating axis;
at least one sliding assembly, assembled to the plate member, and having a leaning surface and a sliding slot; and
a linkage assembly, positioned on the plate member, and comprising a linkage and a carrier base, wherein the linkage passes through the sliding slot of the sliding assembly, and the carrier base is fastened to the linkage and comprises at least one bump, wherein
when the pivoting assembly drives the cam to pivot from a first position to a second position, the cam pushes against the leaning surface to slide the sliding assembly relative to the plate member in a first direction, and the linkage rotates in the sliding slot to drive the carrier base to move in a second direction opposite to the first direction, so that the at least one bump gradually enters into the at least one cavity from leaning the frame to move the frame in a third direction perpendicular to the first direction and to cause the keyboard to gradually have a height difference from the frame from being flush with the frame.

12. The electronic device according to claim 11, wherein when the pivoting assembly drives the cam to pivot from the first position to the second position, the linkage rotates in the sliding slot in a clockwise direction.

13. The electronic device according to claim 11, wherein the linkage mechanism further comprises:
at least one elastic member, having a first end and a second end opposite to each other, wherein the first end is fixed to the plate member, and the second end is fixed to the carrier base of the linkage assembly.

14. The electronic device according to claim 13, wherein when the pivoting assembly drives the cam to pivot from the second position to a third position, the cam leans the leaning surface, so that the sliding assembly does not slide, the linkage does not rotate in the sliding slot, the at least one bump is located in the at least one cavity to keep the frame stationary, the height difference is maintained between the keyboard and the frame, and the elastic member has a maximum tensile deformation amount in the second direction.

15. The electronic device according to claim 14, wherein when the pivoting assembly drives the cam to pivot from the third position to a fourth position, an elastic restoring force of the elastic member pulls the sliding assembly to slide in the second direction, the cam bears against the leaning surface, and the linkage rotates in the sliding slot to drive the carrier base to move in the first direction, so that the at least one bump gradually moves from inside the at least one cavity to outside the at least one cavity to lean the frame, causing the frame move in a fourth direction opposite to the third direction, so that the keyboard is gradually flush with the frame from having the height difference from the frame.

16. The electronic device according to claim 15, wherein when the pivoting assembly drives the cam to pivot from the third position to the fourth position, the linkage rotates in the sliding slot in an anticlockwise direction.

17. The electronic device according to claim 15, wherein the sliding assembly further has at least one locking slot, and the linkage mechanism further comprises:
at least one locking member, passing through the at least one locking slot of the sliding assembly, and positioned on the plate member, wherein when the pivoting assembly drives the cam to pivot from the first position to the second position, and when the pivoting assembly drives the cam to pivot from the third position to the fourth position, the at least one locking slot of the sliding assembly moves relative to the at least one locking member.

18. The electronic device according to claim 11, wherein the carrier base of the linkage assembly has at least one assembling area and at least one first assembling portion, the plate member has at least one second assembling portion, and the at least one first assembling portion is assembled to the at least one second assembling portion, so that the carrier base is positioned on the plate member.

19. The electronic device according to claim 18, wherein one of the at least one first assembling portion and the at least one second assembling portion is a concave portion, and the other of the at least one first assembling portion and the at least one second assembling portion is a convex portion.

20. The electronic device according to claim 11, wherein the pivoting assembly further comprises a hinge structure, assembled together with the rotating axis.

* * * * *